United States Patent Office 3,379,306
Patented Apr. 23, 1968

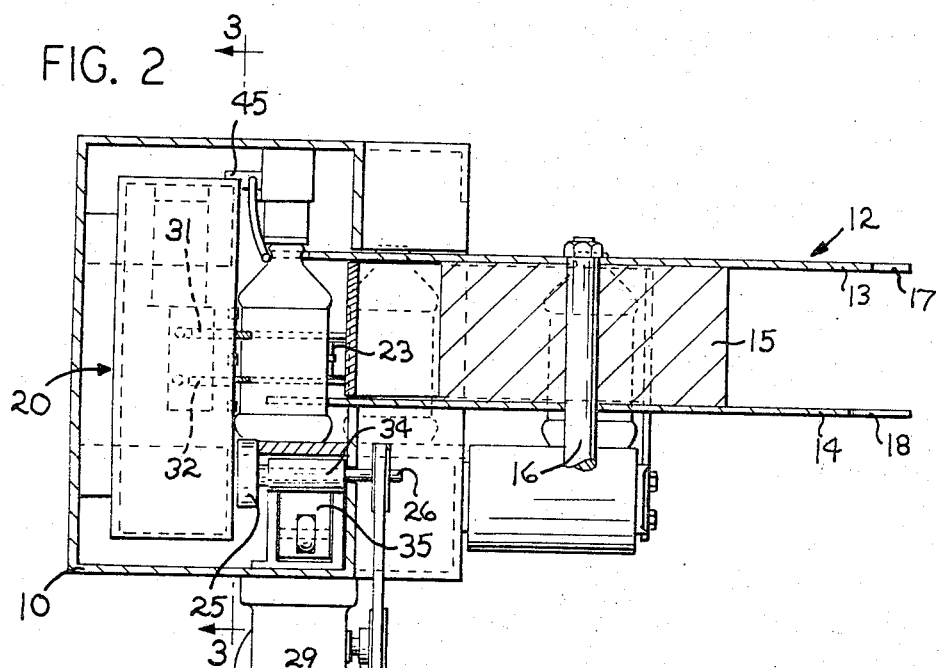

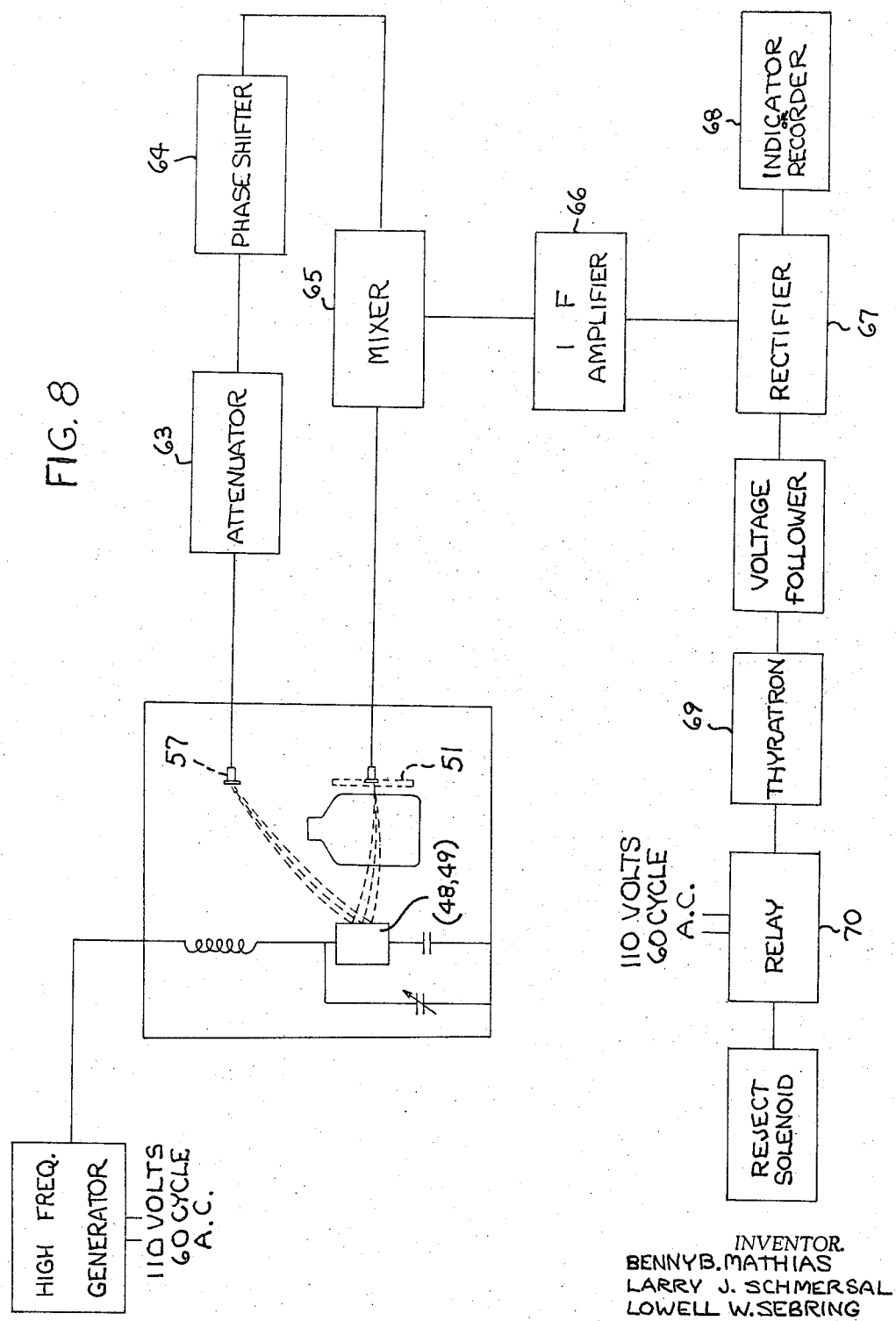

3,379,306
APPARATUS FOR INSPECTING CONTAINERS
FOR WALL THICKNESS DISTRIBUTION
Benny B. Mathias, Maumee, and Larry J. Schmersal and
Lowell W. Sebring, Toledo, Ohio, assignors to Owens-
Illinois, Inc., a corporation of Ohio
Filed Oct. 23, 1965, Ser. No. 502,846
8 Claims. (Cl. 209—111.5)

ABSTRACT OF THE DISCLOSURE

In the inspection of glass containers, the containers are fed individually, and in succession to a rotating carrier which moves the containers into position in front of an inspection device. The inspection device takes the form of radio-frequency source coupled to a pair of antennas which will radiate or establish an electromagnetic field directed so that a portion thereof will pass through the wall of the container with a voltage sensing pickup placed so as to sense the field strength after its passage through a selected portion of the container wall. The container is rotated so as to give a scan of the total circumference of the container wall, at the level of the pickup. The voltage at the pickup constitutes an indication of the wall thickness of the container.

---

It has been the practice in the past to periodically sample glassware, formed on automatic forming machines, after the glassware has been annealed and cooled. These samples were then mechanically calipered to determine the wall thickness of the glass at various points in the wall of the article.

From experience, it has been determined that there are certain limits, with respect to thickness of the glass forming the walls of the article, which are acceptable. In the case of blown glass containers, it has been found that when a container has a thick side wall there will be a correspondingly thin wall portion formed. If the deviation between the thickest and thinnest portion of the wall of the container is beyond tolerances, the container is not acceptable from the standpoint that it may not withstand pressures of the contents to be filled in the container or the container will not have sufficient strength to withstand the handling of the containers through the filling process.

Therefore, it is desirable that those containers which are not up to specification be segregated from the good bottles and discarded prior to shipping of the containers from the glass manufacturer to the bottler.

With the foregoing in view, it is an object of this invention to provide a fully automatic apparatus for positioning, inspecting and segregating bottles, jars and like articles according to their deviations of wall thickness from pre-set standards.

It is an additional object of this invention to provide apparatus that will automatically position bottles and jars for electrical inspection of the wall thicknesses thereof.

It is a further object of this invention to provide an accurate, rapid and dependable electrical system for checking the wall thicknesses of bottles and like articles made from dielectric materials.

It is a still further object of this invention to provide an electrically operated inspection system for automatically segregating and rejecting articles that are defective.

Other and further objects will be apparent from the following description taken in conjunction with the annexed sheets of drawings, wherein:

FIG. 1 is a top plan view of the apparatus of the invention;

FIG. 2 is a cross-sectional view taken at line 2—2 of FIG. 1;

FIG. 8 is a schematic electrical diagram of the electrical system of the invention.

Figure 4:
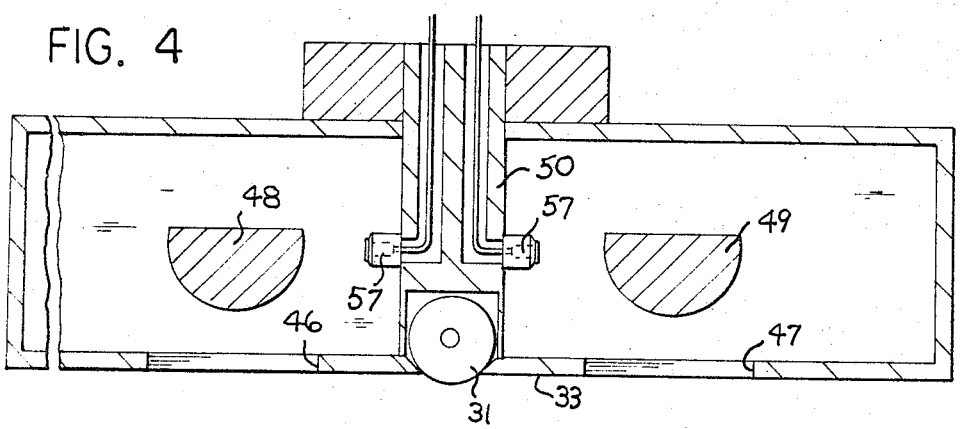
FIG. 4 is a cross-sectional view on an enlarged scale taken at line 4—4 of FIG. 3.

Generally speaking, the method of operation of the apparatus is to feed bottles individually from a succession of bottles into a rotating carrier which carries the bottles in turn to a position in front of an inspection device. While in the position opposite the inspection device, each individual bottle is rotated about its axis which is maintained vertical during the rotation and with that portion of the wall of the bottle which is in close proximity to the measuring device, maintained a fixed, known distance from the inspection device.

Variations in wall thickness of the bottle being inspected will cause an electrical impulse which is transmitted by an electrical system to operate a mechanism to automatically reject a defective bottle at a later time in its movement by the carrier. Acceptable bottles which meet the dimensional limitations as to wall thickness distribution are discharged periodically at one side of the machine.

The specific mechanism by which the above generally described operations are accomplished can be understood by the following description of the details shown in the accompanying drawings.

With specific reference to FIGS. 1 and 2, the major portion of the mechanism is contained within a housing 10. The housing 10 is mounted adjacent an incoming flight conveyor 11 which carries the bottles B to be inspected. In actual practice, the bottles B are spaced along the length of the conveyor 11 so as to arrive in timed relationship with respect to the pockets formed in a carrier 12.

As best shown in FIGS. 1 and 2, the carrier 12 takes the form of a pair of parallel spaced-apart "Micarta" discs 13 and 14. The "Micarta" discs 13 and 14 are connected together and spaced apart by block 15 with the unitary structure generally designated 12 being driven by a shaft 16 fixed centrally thereof. The shaft 16, as will be expected, is driven by a mechanism (not shown) which provides an indexing motion, it being understood that for the particular mechanism shown in FIG. 1, the carrier 12 will be indexed 45° between each measuring interval.

The upper "Micarta" disc 13 is provided with slots 17 within which the neck of bottles B, which are to be inspected, will fit while the lower "Micarta" disc 14 is provided with slots 18 within which the lower side wall portion of the bottle will fit. Thus it can be seen that upon rotation or indexing movement of the carrier 12 in the direction of the arrow 19 shown thereon, the bottles B will be carried in succession from the incoming conveyor 11 into the inspection position opposite the inspection head generally designated 20.

The bottles are guided in their arcuate travel from the incoming conveyor 11 by a pair of spaced-apart "Micarta" rails 21. A substantially identical pair of rails 22 are provided on the exit side of the mechanism. These rails 21 and 22 serve to maintain the bottles within the general area of the slots 17 and 18 of the "Micarta" carrier. In addition, the rails 21 are provided with a facing material of a friction material so that the bottles B, as they are moved from the incoming conveyor 11 into the inspection position, will rotate about their axes to a certain extent. The particular reason for this incoming precess movement will be explained later in regard to the manner in which the bottles are driven at the inspection position.

As the bottles arrive at the inspection position, they are forced outwardly of the slots 17 and 18 by engagement with a spring arm 23 having a roller 24 carried by the end thereof so as to bear against the side wall of the bottle at substantially the middle of the height of the bottle.

Figure 7:
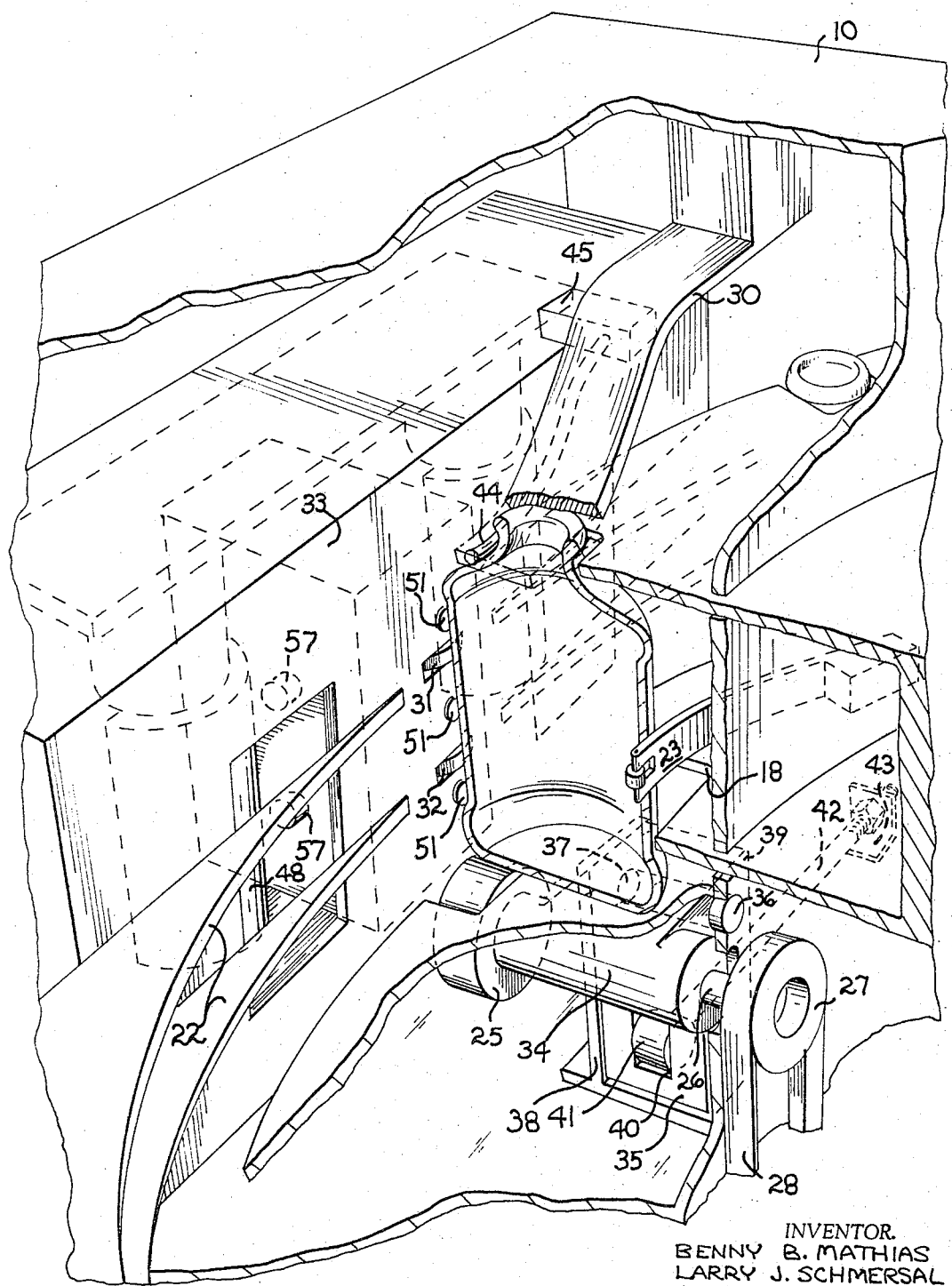
FIG. 7 is a perspective view, partially cut away, of the inspection station of the apparatus of FIG. 1.

As the bottle comes into the position shown specifically in FIG. 2 and FIG. 7, the lower heel portion of the bottle will engage a driving roller 25. The roller 25 is carried by a shaft 26 which in turn is driven by a belt pulley 27. The pulley 27 is driven by a belt 28 from a motor 29. Thus it can be seen that the motor 29, which may be continuously running, will drive the roller 25, thus causing the bottle to rotate about its axis. The bottle is held down in engagement with the roller 25 by a spring member 30 in engagement with the upper finish portion of the bottle.

Figure 5:
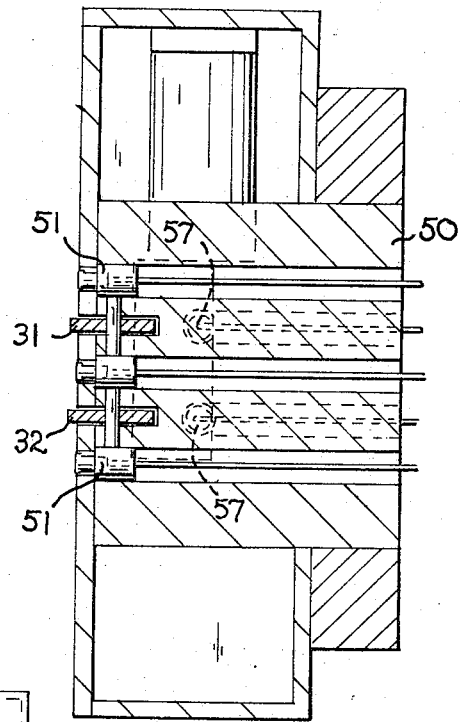
FIG. 5 is a cross-sectional view taken at line 5—5 of FIG. 3 on an enlarged scale.
Figure 3:
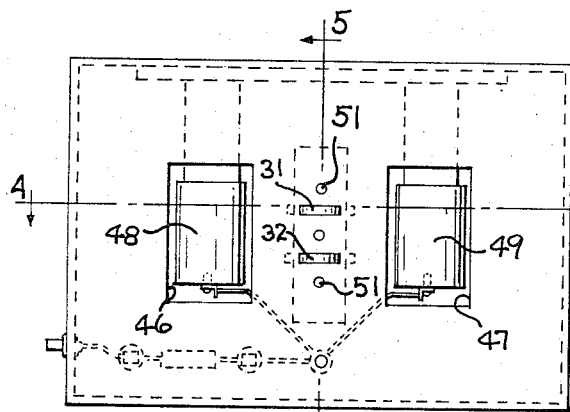
FIG. 3 is a front elevational view of the inspection head taken at line 3—3 of FIG. 2.

A pair of spacing rollers 31 and 32 engage the side of the bottle at two vertically spaced-apart points and serve to hold the bottle wall a fixed distance from the surface 33 of the inspection head generally designated 20 and shown in detail in FIGS. 3–5.

As can best be seen when viewing FIGS. 2 and 7, the shaft 26 which supports the roller 25 and pulley 27 is journaled in a bearing member 34. As can be seen, the bearing member 34 has a generally cylindrical portion serving as the opposite end of the shaft 26 and formed integral with this cylindrical portion is a block 35. The block 35 is pivotally connected at 36 and 37 to a pair of spaced-apart, vertical walls 38 and 39.

The lower portion of the block 35 is provided with a cut out portion 40 within which the end 41 of an eyebolt 42 is pivotally connected. The opposite end of the eyebolt 42 is adjustably mounted with respect to an angle bracket 43. As can readily be seen, the horizontal adjustment of the length of the eyebolt 42 will cause the block 35 to pivot about the axis 36 and 37 and raise or lower the upper surface of the roller 25. This adjustment is provided so as to take care of wear in the roller over an extended period of use. It was also found necessary, in order to provide steady rotation of the bottles, to hold the neck portion of the bottle in relation to the front face 33 of the inspection device. This was accomplished by utilizing a rod member 44 having one end anchored to a mounting block 45 carried by the inspection head 20. Thus it can be seen that the bottles, as they arrive at the inspection station, will be rotated by the roller 25 while the bottles are confined between the rollers 31 and 32 and roller 24 with the spring member 30 maintaining the bottles in good contact with the driving roller 25.

As previously indicated, the rails 21 on the incoming side of the carrier 12 are provided with frictionally engaging surfaces so as to precess or cause the bottles to rotate in a clockwise direction. In this manner the starting friction involved in rotating the bottles is overcome so that when the bottles arrive at the inspection station, shown in FIGS. 2 and 7, the bottles will already be in slight clockwise rotation and engagement with the roller 25 will impart additional clockwise rotation to the bottles during the inspection interval. It was found desirable to provide this initial rotation to the bottles prior to their contact with the roller 25 so as to provide smooth handling of the bottles into the inspection position. Vibration of the bottles is not desirable from both a gauging and handling standpoint.

Turning now to FIGS. 3–6, the inspection head per se will be described in detail.

Basically, the inspection head takes the general form of a rectangular box made of a metal such as aluminum. The front face 33 of the inspection head is provided with a pair of rectangular openings 46 and 47. In back of these openings which serve as windows, there are mounted a pair of antennas 48 and 49. These antennas in actual practice take the form of half of a solid cylinder and are formed of aluminum. Extending through the width of the inspection head 20, is a mounting block 50 for the measuring probes and the reference probes. The measuring probes are generally designated 51 and are shown in detail in FIG. 6, wherein it can be seen that the block 50 is drilled with three vertically spaced passages within each of which is a brass sleeve 52. Within each brass sleeve 52 is a generally cylindrical sleeve of Teflon 53. A brass screw 54 is inserted within the Teflon member and a copper conductor 55, which extends through an axial opening formed in the Teflon material, is connected to the brass screw. The brass screw serves as the measuring probe for the inspection system. As shown specifically in FIG. 6, the brass screw has a concave outer face to which may be cemented a convex glass lens 56.

Figure 6:
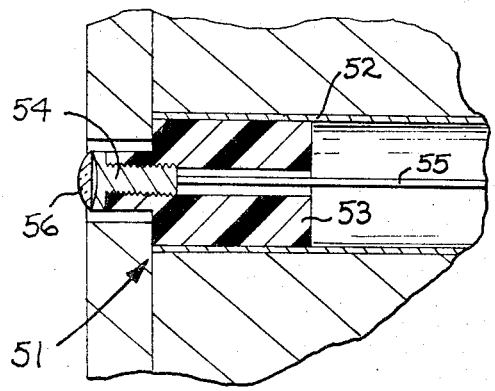
FIG. 6 is an enlarged perspective view of one sensing probe used in the inspection head.

The glass lens 56, as can be seen in FIG. 6, has its outer, convex surface extending beyond the plane of the front face 30 of the inspection head assembly. It was found that the apparatus of the invention would function without the lens 56, but that an increase in signal strength would be provided by the inclusion of the lens. When the measuring probe 51 has a lens cemented thereto, it is essential that the lens extends beyond the front face of the inspection head to be effective to increase the sensing signal strength. The effect that presence of the lens has on the electric field is not fully known, however, as explained above, an increased signal strength is obtained.

The spacing of the bottle side wall from the measuring probe is critical from the standpoint that, as between successive measurements, it is necessary that this dimension be maintained so that the device will be accurate.

Thus, to provide the best signal, it is important that the probe position relative to the bottle wall be constant throughout the inspection period.

Each of the probes 51 shown in FIGS. 3 and 5 are constructed in this manner. In addition to the measuring probes 51, the block 50 carries the axles for the rollers 31 and 32. The block 50, as best shown in FIGS. 4 and 5, has openings formed therein which open out into the interior of the measuring head 20 in proximity to the antennas 48 and 49. Within each of these openings, of which there are four, a reference probe 57 is mounted. These reference probes 57 are utilized in the electrical system of this invention to provide a "bucking" voltage or nulling voltage for the measuring voltage when an acceptable bottle is in the measuring position.

As can be seen when viewing FIGS. 3, 5 and 7, three measuring probes 51 are utilized and thus provide an indication of the wall thickness of the bottle at three generally vertically spaced-apart zones. After the bottles have completed the period of inspection, they will be indexed by the carrier 12 to the position where the bottom of the bottle will be resting on an outgoing conveyor 58.

A reject mechanism generally designated 59 is mounted on the side of the housing 10 and may take the form of a solenoid operated fluid motor 60 having a reciprocable output member 61. With the member 61 in the position shown the bottles arriving on the outgoing conveyor 58 will be prevented from moving out of the pockets formed in the carrier 12 and the bottles will be subsequently conveyed to the position shown by the empty pockets 62, wherein the bottles will be discharged and rejected from the machine. In the event the bottle being gauged or inspected is of acceptable wall thickness, the member 61 will be retracted permitting the bottle to move on the conveyor 58 out of the pocket and to the subsequent packing area.

With reference to FIG. 8, the function of the electrical system and the gauging operation will be described.

A suitable radio frequency transmitter is coupled to the antennas 48 and 49 establishing an electromagnetic field extending through the windows 46 and 47 and bending back toward the measuring probes or sensing elements 51. The location of the openings 46 and 47 with respect to the antenna and the probe is instrumental in determining the path of the flux which terminates on the probe. In view of the fact that the bottles to be inspected are positioned in close proximity to the measuring probes 51, the field will extend through the dielectric formed by the bottle and the voltage produced at the measuring probe will be an indication of the thickness of the glass bottle, and in particular that portion of the glass bottle which is directly opposite the measuring probe. At the same time, the RF signals or field emanating from the antennas 48 and 49 will produce a voltage at the reference probe 57. The spacing of the reference probes from the antennas is adjustable so that the strength of the signal received at the reference probes may be selected by the physical positioning of reference probes from the antenna. The output of the reference probes is fed to an attenuator 63. The function of the attenuator is to provide a magnitude calibration. The output of the attenuator is in turn connected to a phase shifter 64, with the output of the phase shifter going into a mixing and coupling device 65. The voltage received at the measuring probes 51 is also fed to the mixer 65, with the output of the mixer connected to an IF amplifier 66. It should be kept in mind that the reference voltage signal is "bucked" against the measuring signal so that any selected portion of the measuring signal will be transmitted to the IF amplifier. The output of the IF amplifier 66 is connected to a rectifier 67 providing an output voltage which is a DC voltage. This DC voltage may be connected to an indicator or recording meter 68 or, as shown, is also connected to a voltage follower which in turn is connected to a thyratron 69. The thyratron is connected to a relay 70. The operation of the relay will control a reject solenoid whose function or operation controls the reject motor 60. In this manner if the signal in the rectifier 67 is of sufficient magnitude to operate the thyratron tube, the relays will be operated to cause reject of a particular bottle. Obviously, the signal to the relay is delayed in any suitable well-known manner so that the proper bottle is rejected.

By utilizing a reference probe rather than deriving the reference signal from the RF source, for bucking against the measuring signal, applicants' system will be free of amplitude variations caused by the variations in the RF signal coupled to the antennas.

Other and further modifications may be resorted to in conformity with the spirit and scope of the appended claims.

We claim:

1. Apparatus for automatically detecting jars, bottles and like articles having excessive variations of wall thickness, comprising, a high frequency generator, a housing, an antenna mounted in said housing, an opening formed in the face of said housing through which an electromagnetic field extends outwardly therefrom, a measuring sensing element mounted in said housing and spaced from said antenna with its end exposed to the field, means for placing a container in the field in close proximity to the sensing element, means for rotating the container about its axis while maintained in the field and means connected to said element for measuring the variations in potential at the sensing element.

2. The apparatus of claim 1, further including a reference sensing element in said field at a position which is independent of the container presence, electrical means connected to said sensing elements for balancing out the portion of the signal from the measuring element that is related to a container of a known thickness, and means for indicating that difference potential which is indicative of the presence of the changing dielectric.

3. Apparatus for automatically detecting jars, bottles and like articles having excessive variations in wall thickness comprising, a fixed inspection head, a bottle carrier, means for driving said bottle carrier to bring bottles in succession to a predetermined position at an inspection station in proximity to said inspection head, driving means at said inspection station for engaging the bottom heel portion of a bottle and rotating the bottle about its vertical axis, means at said inspection station for engaging the finish portion of the bottle to maintain the axial orientation of the bottle during rotation, means connected to said inspection head for creating an electromagnetic field extending through the wall of the bottle to be inspected and, means to indicate the changes in flux density of the field during rotation of the bottle wall.

4. The apparatus of claim 3, wherein said inspection head comprises at least one antenna, at least one measuring probe at the inspection station, and the means to measure the flux density comprises voltage measuring means connected between the antenna and probe.

5. The apparatus of claim 3, wherein said inspection head comprises a metallic enclosure having an opening in one side, an antenna mounted in the enclosure behind the opening, a plurality of vertically spaced measuring probes of small cross-section, immediately adjacent the wall of the bottle when at the inspection station, a source of high frequency current connected to said antenna, and voltage measuring means connected to said probes.

6. Apparatus for automatically detecting jars, bottles and like articles having excessive variations of wall thickness, comprising, a high frequency generator, a housing, an antenna mounted in said housing, an opening formed in the face of said housing through which an electromagnetic field extends outwardly therefrom, a measuring sensing element mounted in said housing and spaced from said antenna with its end exposed to the field, indexing means for moving a container from a conveyor into the field in close proximity to the sensing element, means cooperating with the container during index movement for rotating the container about its axis, means for continuing the rotation of the container about its axis while maintained in the field and means connetced to said element for measuring the variations in potential at the sensing element.

7. The apparatus of claim 6, further including thyratron means connected to said potential measuring means, a relay connected to said thyratron and operative upon receipt of a signal and reject means connected to said relay for rejecting containers having unacceptable wall thickness variations.

8. The apparatus of claim 7, further including a reference signal sensing element in said field at a position which is independent of the container presence, electrical means connected to said sensing elements for balancing out the portion of the signal from the measuring element that is related to a container of a known thickness, rectifier means connected to said electrical means and means connecting said rectifier output to said thyratron.

References Cited

UNITED STATES PATENTS

| | | | |
|---|---|---|---|
| 2,100,227 | 11/1937 | Stoate et al. | 209—111.7 |
| 2,885,557 | 5/1959 | Kizaur | 250—52 |
| 2,890,347 | 6/1959 | McCormick | 250—52 X |
| 3,150,266 | 9/1964 | Mathias | 250—213 |
| 3,307,446 | 3/1967 | Rottmann | 88—14 |
| 3,117,276 | 1/1964 | Beyer et al. | 324—58.5 |
| 3,258,688 | 6/1966 | Augustine et al. | 324—58.5 |

ALLEN N. KNOWLES, *Primary Examiner.*